United States Patent [19]

Yoshida

[11] Patent Number: 5,432,426
[45] Date of Patent: Jul. 11, 1995

[54] CHARGING DEVICE OF A SECONDARY BATTERY FOR CONTROLLING TERMINATION OF CHARGING IN RESPONSE TO THE CHANGE STATE OF TERMINAL VOLTAGE OF THE SECONDARY BATTERY

[75] Inventor: Yoshiyuki Yoshida, Gunma, Japan

[73] Assignee: Sanyo Electric Co., Ltd., Osaka, Japan

[21] Appl. No.: 84,805

[22] Filed: Jun. 29, 1993

[30] Foreign Application Priority Data

Jul. 10, 1992 [JP] Japan .................. 4-184005

[51] Int. Cl.$^6$ ............................................. H02J 7/04
[52] U.S. Cl. ........................................ 320/20; 320/40; 320/43
[58] Field of Search .................. 320/20, 30, 31, 39, 320/40, 43

[56] References Cited

U.S. PATENT DOCUMENTS

| | | | |
|---|---|---|---|
| 4,388,582 | 6/1983 | Saar et al. | 320/20 |
| 4,392,101 | 7/1983 | Saar et al. | 320/20 |
| 4,503,378 | 3/1985 | Jones et al. | 320/20 |
| 4,639,655 | 1/1987 | Westhaver et al. | 320/14 |
| 4,746,852 | 5/1988 | Martin | 320/20 |
| 5,166,623 | 11/1992 | Ganio | 324/427 |
| 5,268,630 | 12/1993 | Bhagwat et al. | 320/20 |

FOREIGN PATENT DOCUMENTS

| | | |
|---|---|---|
| 0444617 | 9/1991 | European Pat. Off. . |
| 53-40695 | 10/1978 | Japan . |
| 62-23528 | 5/1987 | Japan . |

*Primary Examiner*—Steven L. Stephan
*Assistant Examiner*—Robert Nappi
*Attorney, Agent, or Firm*—Spensley Horn Jubas & Lubitz

[57] ABSTRACT

A control section detects terminal voltage of a battery periodically and stores it in a memory, then calculates the most recent gradient and average gradient of a charging curve from the storage contents. When the most recent gradient becomes greater than the average gradient by a predetermined value or more, the control section judges it to be the last stage of the charging. After this, the control section compares the most recent terminal voltage with the preceding terminal voltage which are detected and stored in sequence. When they become equal to each other, the control section turns off a charge switch for terminating the charging. Thus, a rise in the terminal voltage at the last stage of the charging is detected securely and the subsequent peak is detected accurately.

16 Claims, 5 Drawing Sheets

CHARGING DEVICE OF A SECONDARY BATTERY FOR CONTROLLING TERMINATION OF CHARGING IN RESPONSE TO THE CHANGE STATE OF TERMINAL VOLTAGE OF THE SECONDARY BATTERY

BACKGROUND OF THE INVENTION

1. Field of the Invention

This invention relates to a charging device which rapidly charges a secondary battery and more particularly to a charging device appropriate for charging a nickel-hydrogen battery.

2. Description of the Related Art

FIG. 1 shows a general charging curve showing the relationship between terminal voltage V and time T while a nickel-hydrogen battery is being charged, wherein P is a peak in the voltage; It is desirable to stop the charging at the time.

A conventional charging device of a secondary battery measures the terminal voltage of the secondary battery at given time intervals, and when it becomes equal to the immediately preceding measurement value, judges the voltage to be the peak of the charging curve and terminates the charging. Another conventional charging device is designed to stop charging when the voltage drops by a predetermined value from the past peak in the voltage, that is, when $-\Delta V$ is detected.

The charging device of a storage battery disclosed in Japanese Patent Publication No. Sho 62-23528 calculates a slope amount of a charging curve sequentially and compares it with its adjacent slope amount for detecting in sequence an inflection point showing a point in the time when the slope amount changes from decrease to increase or from increase to decrease. When the inflection point matches a plurality of inflection points occurring in a predetermined order previously stored, the charging is stopped. That is, the charging device detects the boundary between regions II and III in FIG. 1, A, and that between regions III and IV, B, and detects inflection point B, then stops the charging.

As a further example, the charging device of a battery disclosed in Japanese Patent Publication No. Sho 53-40695 detects a slope of a charging curve and when the slope becomes equal to or greater than a predetermined value, stops the charging. That is, when detecting region III or IV in FIG. 1, the charging device stops the charging.

However, the region II in FIG. 1 may be formed extremely like a horizontal line depending on variations in the characteristic of batteries and a difference in ambient temperatures. In such a case, if the charging device is designed to judge it to be a peak if the immediately preceding terminal voltage equals the most recent terminal voltage, the peak is detected in the region II far before the real peak P.

If a device with a battery is used while the battery is being charged and when the terminal voltage temporarily drops, a dent occurs in the charging curve as shown in FIG. 2, and in its neighborhood, a peak of the curve or predetermined voltage drop $-\Delta V$ or an inflection point is detected.

As compared with a nickel-cadmium battery, the nickel-hydrogen battery has a characteristic in which voltage drop $-\Delta V$ is hard to appear. Further, a battery generates heat at full charging; the nickel-hydrogen battery has poor heat resistance and if heat is generated too much, performance of the battery degrades, thus a peak must be detected accurately.

SUMMARY OF THE INVENTION

Accordingly, an object of the invention is to provide, even if region II in FIG. 1 is formed like a horizontal line or even if voltage temporarily drops by using a device with a battery which is being charged as shown in FIG. 2, a charging device which does not erroneously detect it as a peak.

To the end, according to one embodiment of the invention, there is provided a charging device of a secondary battery for detecting terminal voltage of the secondary battery at charging for controlling termination of the charging in response to change state of a detection value, the charging device comprising:

means for supplying a charging current to the secondary battery;

means for detecting a terminal voltage of the secondary battery;

most recent gradient calculation means for finding a most recent gradient from the current change state of the terminal voltage detected by the detection means;

average gradient calculation means for finding an average gradient from the change state, for a comparatively long term, of the terminal voltage detected by the detection means;

gradient comparison means for comparing the most recent gradient with the average gradient;

voltage comparison means for comparing the most recent terminal voltage with a terminal voltage a predetermined time before;

termination determination means being responsive to outputs of the gradient comparison means and the voltage comparison means for determining termination of charging by the fact that the most recent terminal voltage becomes equal to or greater than the terminal voltage the predetermined time before after the most recent gradient becomes greater than the average gradient by a predetermined value or more; and control means being responsive to the termination of the charging determined by the termination determination means for controlling the charging current supply means so as to stop the charging current to the secondary battery.

Thus, in the embodiment of the invention, the most recent gradient and average gradient are calculated and compared with each other. When the most recent gradient becomes greater than the average gradient by a predetermined value or more, it is determined that region III in FIG. 1, namely, the last stage of the charging is entered. After this, terminal voltage detected in sequence is compared with terminal voltage a predetermined time before. When the most recent terminal voltage becomes equal to or less than the terminal voltage the predetermined time before, termination of the charging is detected.

Therefore, if the last stage of the charging is not reached, even if region II in FIG. 1 is formed like a horizontal line or the terminal voltage drops by using a device with a battery which is being charged, it is not erroneously detected as the peak. Thus, the peak P in FIG. 1 can be detected accurately and preferred charging control can be performed.

Preferably, the charging device should further include storage means for storing terminal voltage data of the secondary battery detected by the voltage detection means. The storage means facilitates data processing.

The storage means always stores a predetermined number of voltage data pieces including the most recent data piece detected by the voltage detection means. When the most recent voltage data piece is input, the storage means may discard the oldest voltage data piece, thereby reducing the storage means capacity to the minimum.

The voltage detection means detects the terminal voltage repeatedly at given time intervals, thereby easily detecting a gradient.

The most recent gradient calculation means calculates repeatedly the most recent gradient at the same given time intervals as the given time intervals at which the voltage detection means detects the terminal voltage by using two terminal voltages detected at time intervals each being an integer multiple of the given time interval.

Thus, the most recent gradient can be calculated every given time, for example, every minute, and the most recent data piece and a data piece a predetermined time before, for example, 3 minutes before, can be used for the gradient calculation. The gradient calculated from a voltage change for one minute is too small; a change in the gradient cannot accurately be detected. A change in the gradient for three minutes is detected for accurate detection. Further, the comparison itself is made every minute to prevent late detection.

The two terminal voltages used to calculate the most recent gradient are the most recent and oldest ones of a predetermined number of voltage data pieces stored in the storage means.

For example, four data pieces detected every minute are stored in the storage means and the difference between the most recent and oldest data pieces is calculated, thereby calculating the most recent gradient.

The voltage comparison means makes a comparison at given time intervals, for example, every minute; it compares two terminal voltage data values detected at time intervals each being an integer multiple of the given time interval, for example, at 3-minute intervals, thereby accurately detecting without any delay.

The average gradient calculation means calculates the difference between the most recent and oldest voltage data pieces stored in the storage means, accumulates the resultant difference, and divides the cumulative value by the number of times the difference has been accumulated for calculating the average gradient.

Thus, the voltage change amount, for example, for three minutes can be accumulated, and the cumulative value is divided by the accumulation count, thereby providing the change amount for three minutes as the average gradient. Since the most recent gradient is also a change amount for three minutes, the most recent gradient can be easily compared with the average gradient.

The difference between the most recent and oldest voltage data pieces is accumulated from starting of charging to the present. Thus, the number of times the difference has been accumulated or the accumulation count can be counted by a counter reset at the start of the charging; the configuration can be made simple.

The charging termination determination means turns on an identification flag when it is determined that the most recent gradient becomes greater than the average gradient by the predetermined value or more in response to the output of the gradient comparison means.

When the flag is on, the termination determination means monitors the output of the voltage comparison means for determining termination of the charging.

Thus, the CPU can be used for determining the termination of the charging easily by software.

Further, such charging control is suitable particularly for a nickel-hydrogen battery.

DESCRIPTION OF THE PREFERRED EMBODIMENTS

Referring now to the accompanying drawings, there is shown an embodiment of the invention.

Figure 3:
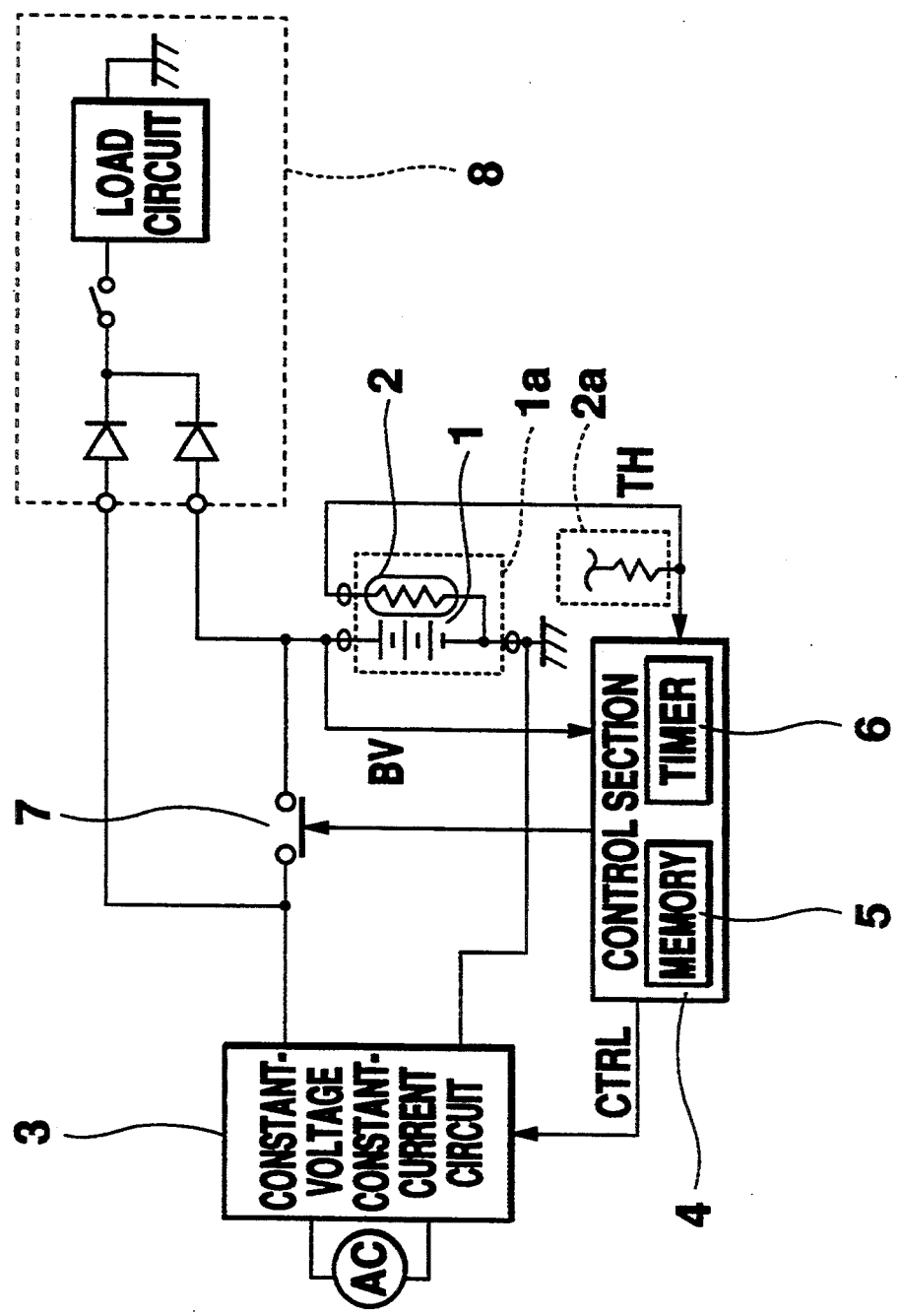
FIG. 3 is a block diagram showing the circuit configuration according to an embodiment of the invention.

FIG. 3 is a block diagram showing the circuit configuration according to an embodiment of the invention, wherein numeral 1 is a battery to be charged and numeral 2 is a thermistor, both of which are integrated as a battery pack 1a. The thermistor 2 is a resistor whose resistance value changes in response to temperature; it detects both the presence or absence and temperature of the battery 1 and an output line of the thermistor 2 is pulled high with pull-up means 2a to a predetermined potential. Therefore, when the battery pack 1a is mounted, a current flows into the thermistor 2 and its output voltage TH becomes a value less than the predetermined potential conforming to the temperature of the battery 1. On the other hand, if the battery pack 1a is not mounted, no current flows into the thermistor 2 and the voltage TH becomes the predetermined potential pulled high. In FIG. 3, contacts of the battery pack 1a with other circuits are denoted by circles. Numeral 3 is a constant-voltage constant-current circuit which converts an AC power supply into DC for supplying a charging current to the battery 1. The circuit has two output modes of constant voltage and constant current; when it is connected to the AC power supply, the circuit is started up in the constant-voltage mode. Numeral 4 is a control section which contains memory 5 such as RAM, a timer 6, an analog-to-digital converter (not shown), and a central processing unit (not shown). The control section 4 uses a control signal CTRL to perform control including a mode change of the constant-voltage constant-current circuit 3; terminal voltage BV of the battery 1 which is input is stored in the memory 5 and a charge switch 7 which opens or closes a supply route of the charging current to the battery 1, based on the calculation result from the storage contents. Numeral 8 is a load circuit 8 such as a computer.

Figure 4:
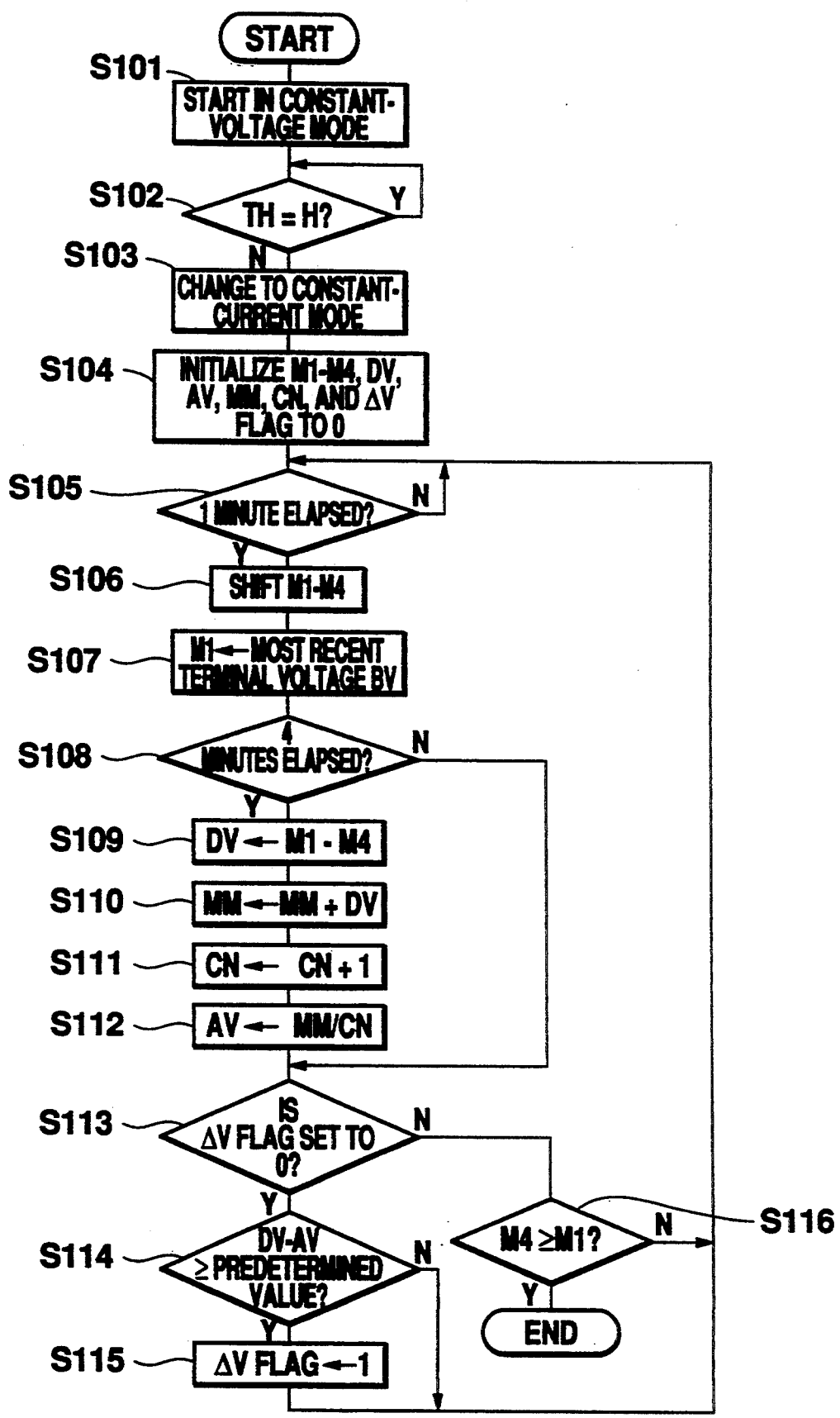
FIG. 4 is a flowchart showing the operation of circuitry according to the embodiment of the invention.

The operation of the circuitry is described in conjunction with a flowchart shown in FIG. 4. When the constant-voltage constant-current circuit 3 is connected to the AC power supply AC, it is started up in the constant-voltage mode at step S101. First, the control section 4 checks signal TH at step S102. If TH is less than the predetermined potential at the step, the control section 4 judges that battery pack 1a is mounted, and turns on the charge switch 7. The control section 4 also uses control signal CTRL to change the constant-voltage constant-current circuit 3 to the constant-current mode at step S103. Rapid charging is thus started. At step S104, the control section 4 initializes to 0 various variables, namely, M1 to M4 to store values of terminal voltage BV, most recent voltage rise value (most recent gradient) DV, average voltage rise value (average gradient) AV, cumulative value of voltage rise MM, counter CN which is the number of times the cumulative value MM has been updated, and Δ V flag. When the most recent gradient DV becomes greater than the average gradient AV by a predetermined value or more, the Δ V flag is set to 1, indicating that the last stage of charging is reached.

After this, in the embodiment, the timer 6 is monitored to perform the following steps at 1-minute intervals.

Figure 5:
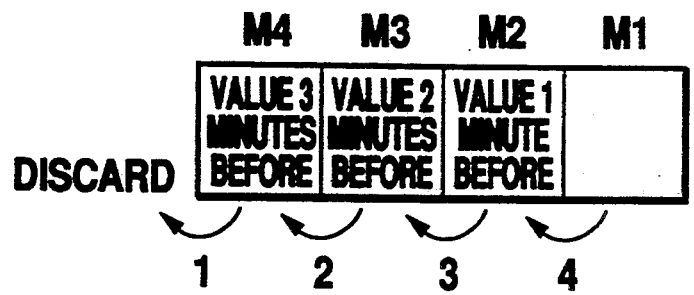
FIG. 5 is an illustration of shift operation of M1-M4.

M1 to M4 storing the most recent value to value 3 minutes before of terminal voltage BV are shifted in the arrow number order as shown In FIG. 5 at step S106, then terminal voltage BV of the battery 1 is read and converted from analog form into digital form and the resultant digital value is set to M1 at step S107. Therefore, M1 represents the most recent value of terminal voltage BV for each minute and M2 to M4 represent values of terminal voltage BV 1 minute before, 2 minutes before, and 3 minutes before respectively.

Steps S109 to S112 are skipped and a check is made to see if the Δ V flag is set to 0 at step S113 until the time of 4 minutes elapses after the charging starts. Since the Δ V flag, DV, and AV remain initialized to 0, control proceeds to step S114 where a check is made to see if the most recent gradient DV is greater than the average gradient AV by a positive predetermined value or more. Since DV=AV=0 at the beginning (N at step S114), no operation is performed and control returns to step S105, the start of the loop.

When the time of 4 minutes has elapsed at step S108, M1 to M4 initialized to 0 become all valid data and control proceeds to step S109 where the most recent voltage rise value (most recent gradient) is calculated from DV=M1−M4. Then, the cumulative value of voltage rise, MM, is calculated from MM=MM+DV at step S110; 1 is added to the counter CN at step S111; and the average voltage rise value (average gradient) is calculated from AV=MM/CN at step S112. However, since the Δ V flag remains 0 and the average gradient AV is greater than the most recent gradient DV, as shown in FIG. 6(a), for a while, the expression DV−AV≧predetermined value is not true (N at step S114 in FIG. 4) and control returns from step S114 to step S105.

Figure 1:
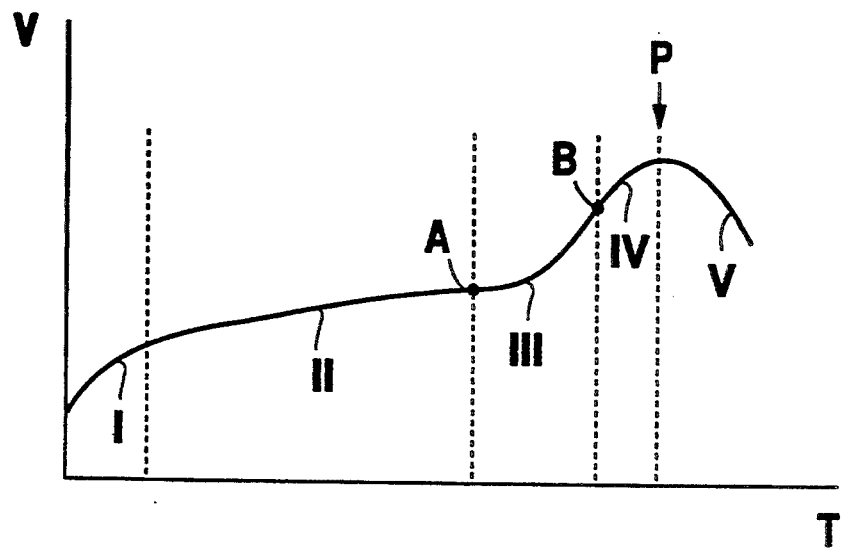
FIG. 1 is a graph showing a charging curve representing the relationship between the terminal voltage and time of a secondary battery which is being charged.
Figure 6:
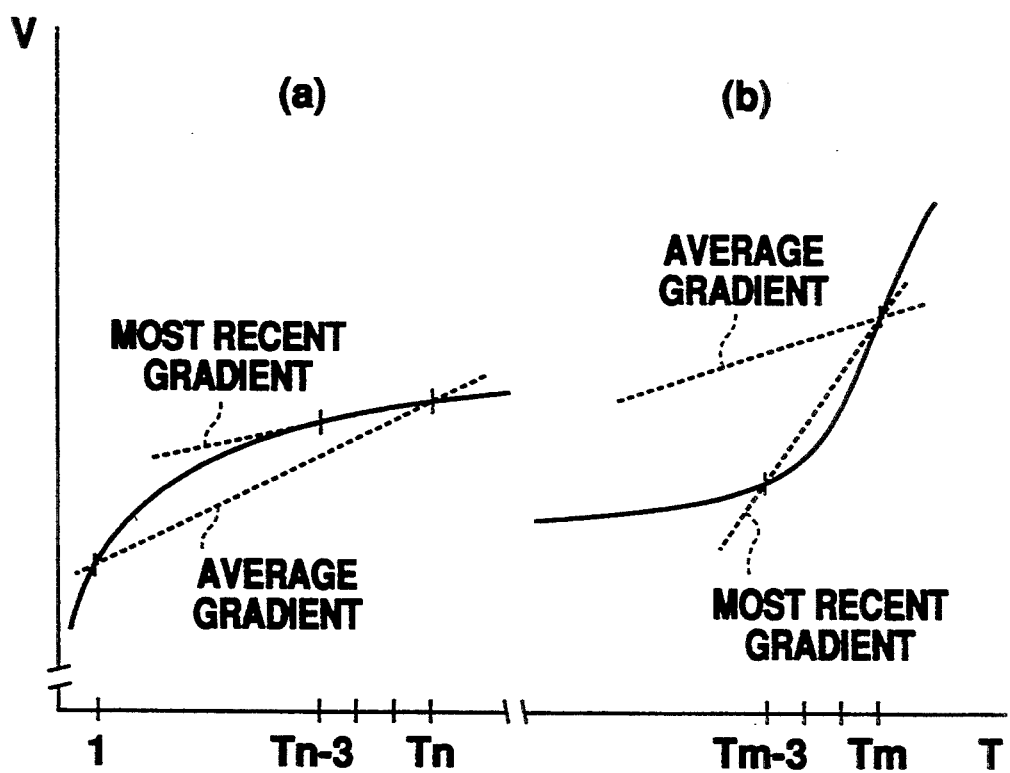
FIG. 6 is a graph showing the most recent gradient and average gradient of a charging curve.

When the most recent gradient becomes greater than the average gradient as shown in FIG. 6(b) and the result of DV−AV becomes equal to or greater than the predetermined value at step S114, the Δ V flag is set to 1 at step S115, indicating that the gradient becomes rapidly great or that region III in FIG. 1, namely, the last stage of the charging is entered.

Returning to FIG. 4, since the terminal voltage of the battery 1, BV, is still read at 1-minute intervals after step S115, M1 to M4 represent the most recent value to values 1 minute before to 3 minutes before of the terminal voltage BV, as described above. Since the Δ V flag is already set to 1, control proceeds from step S113 to step S116 where the most recent terminal voltage M1 is compared with the terminal voltage 3 minutes before, M4. When M1 becomes equal to or less than M4, that is, reach of the peak P in FIG. 1 is recognized, the charge switch 7 is turned off for terminating the charging.

In the embodiment, a check is made to see if the peak P is reached every minute, as described above. At the time, the most recent terminal voltage value M1 is compared with M4, the value 3 minutes before, rather than M2, the value 1 minute before (the immediately preceding value). This is because a comparison between M1 and M2 results in little difference.

Figure 7:
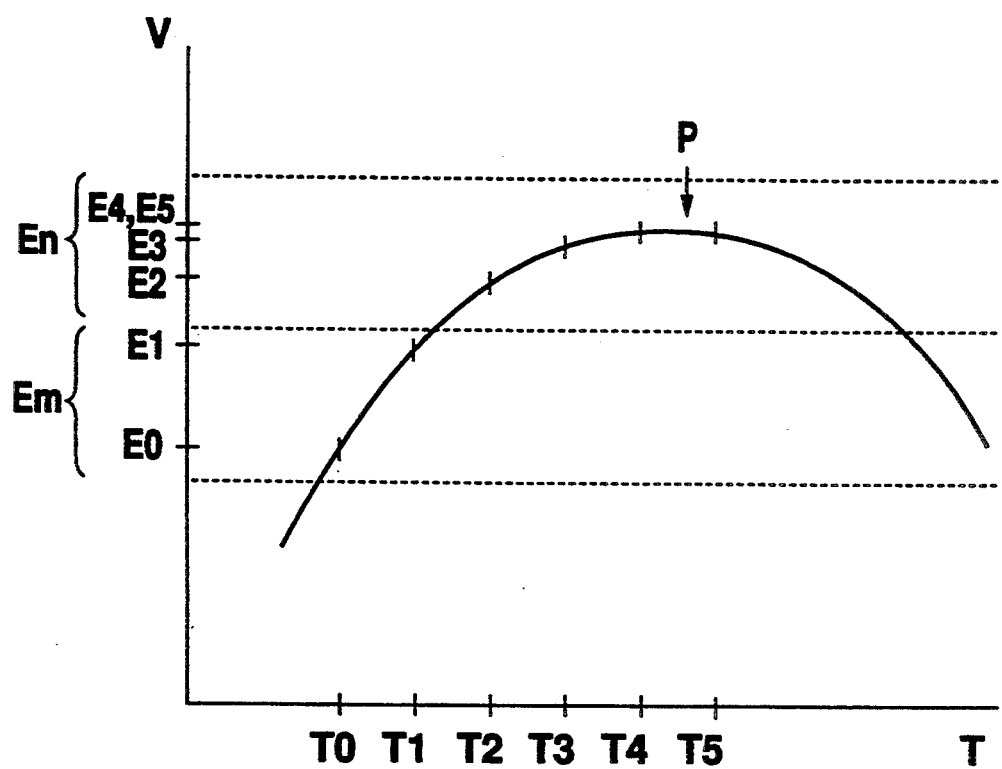
FIG. 7 is an enlarged graph around the peak of the charging curve.

FIG. 7 is an enlarged graph around the peak of the charging curve. Depending on limitations of the precision of a detector, terminal voltages E0 and E1 at times T0 and T1 may also be detected as the same voltage Em and terminal voltages E2 to E5 at times T2 to T5 as the same voltage En. In this case, if the method of comparing the most recent terminal voltage with the immediately preceding terminal voltage is used, the expression E2≧E3 becomes true at time T3, leading to an erroneous assumption of the peak at time T3 before the real peak P. Then, by comparing the most recent terminal voltage with the terminal voltage 3 minutes before, the expressions E0≧E3 and E1≧E4 become false at times T3 and T4 respectively and the expression E2≧E5 becomes true at time T5, enabling the real peak P to be recognized more securely.

Likewise, the difference between the most recent terminal value and the terminal value 3 minutes before (M1−M4) is also used to calculate the most recent voltage rise value DV because a comparison between M1 and M2 results in little difference. Since the value DV is also added to the cumulative value of voltage rise, MM, the most recent voltage rise value DV and the cumulative value MM become both three times the actual values, that is, become values with 3 minutes as one unit time. Since the counter CN is incremented by one only each time DV is added, MM/CN also results in three times the actual average gradient finally.

Although calculation and comparison are made every minute, change amounts for the past three minutes are used as the calculation and comparison data.

Figure 2:
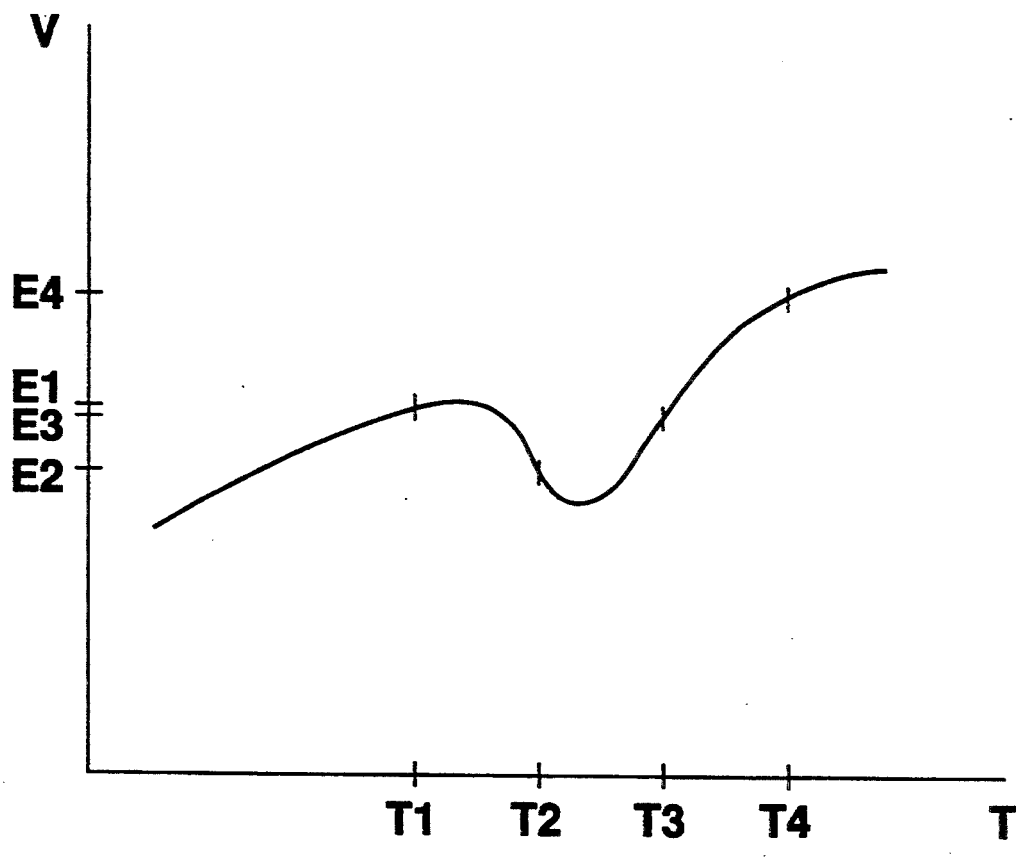
FIG. 2 is a graph showing a terminal voltage drop occurring during charging.

When a device with battery 1 is used while the battery 1 is being charged, the terminal voltage of the battery 1 temporarily drops, and a dent occurs in the charging curve. FIG. 2 is an enlarged graph of a voltage change in the dent portion for easy understanding. Since the gradient in the period T1-T2 becomes negative in the graph, if the peak is judged to be passed from the negative gradient, the terminal voltage E1 at time T1 is erroneously detected as the peak voltage. At so-called −Δ V detection, erroneous detection is also made as a voltage drop after the peak when E1−E2≧Δ V. If inflection points are detected, since the slope amount having a tendency toward a decrease until the period T1-T2 changes to an increase in the period T2-T3, an inflection point is detected here, and the slope amount again decreases in the subsequent period T3-T4 and an inflection point s also detected here.

However, according to the embodiment, the gradient in the period T2-T3 drastically increases with respect to the gradient in the immediately preceding period T1-T2, as shown in FIG. 2, but does not become so great with respect to the average gradient, thus the expression DV−AV≧predetermined value does not become true at step S114 in FIG. 4. This means that it is not erroneously detected as region III in FIG. 1.

The charging device of a secondary battery according to the embodiment of the invention can detect securely a rise in the terminal voltage at the last stage of charging without erroneously detecting as a peak a terminal voltage drop occurring when a device with a battery is used while the battery is being charged.

What is claimed is:

1. A charging device of a secondary battery for detecting terminal voltage of the secondary battery during charging for controlling termination of a charging operation, said charging device comprising:
   means for supplying a charging current to the secondary battery;
   means for detecting a terminal voltage of said secondary battery;
   most recent gradient calculation means for finding a most recent gradient of the terminal voltage detected by said detection means;
   average gradient calculation means for finding an average gradient, for a comparatively long term, of the terminal voltage detected by said detection means;
   gradient comparison means for comparing said most recent gradient with said average gradient;
   voltage comparison means for comparing the most recent terminal voltage with a previously measured terminal voltage;
   termination determination means responsive to outputs of said gradient comparison means and said voltage comparison means for determining termination of charging by the fact that said most recent terminal voltage becomes equal to or less than said previously measured terminal voltage at a time after said most recent gradient becomes greater than said average gradient by at least a predetermined value; and
   control means responsive to said termination determination means for controlling said charging current supply means so as to stop the charging current to the secondary battery.

2. The charging device as claimed in claim 1 further including means for storing terminal voltage data of the secondary battery detected by said voltage detection means.

3. The charging device as claimed in claim 2 wherein said storage means stores a predetermined number of voltage data pieces including the most recent data piece detected by said voltage detection means, wherein storage of the most recent voltage data piece causes said storage means to discard the oldest voltage data piece.

4. The charging device as claimed in claim 3 wherein said voltage detection means detects the terminal voltage repeatedly at given time intervals.

5. The charging device as claimed in claim 4 wherein said most recent gradient calculation means calculates repeatedly the most recent gradient at the same given time intervals as the given time intervals at which said voltage detection means detects the terminal voltage by using two terminal voltages detected at time intervals each being an integer multiple of said given time interval.

6. The charging device as claimed in claim 5 wherein said two terminal voltages used to calculate the most recent gradient are the most recent and oldest ones of a predetermined number of voltage data pieces stored in said storage means.

7. The charging device as claimed in claim 4 wherein said voltage comparison means makes repeatedly a comparison at the same given time intervals as the given time intervals at which said voltage detection means detects the terminal voltage by using two terminal voltages detected at time intervals each being an integer multiple of said given time interval.

8. The charging device as claimed in claim 7 wherein said two terminal voltages used to make a comparison are the most recent and oldest ones of a predetermined number of voltage data pieces stored in said storage means.

9. The charging device as claimed in claim 4 wherein said most recent gradient calculation means calculates repeatedly the most recent gradient at the same given time intervals as the given time intervals at which said voltage detection means detects the terminal voltage by using two terminal voltages detected at time intervals each being an integer multiple of said given time interval; and
   said voltage comparison means makes repeatedly a comparison at the same given time intervals as said most recent gradient calculation means calculates the most recent gradient, wherein the two terminal voltages to be compared with each other are the same as the two terminal voltages used for the said most recent gradient calculation means to calculate the most recent gradient.

10. The charging device as claimed in claim 9 wherein the two voltage data pieces used to calculate the most recent gradient by said most recent gradient calculation means and to make a comparison by said voltage comparison means are the most recent and oldest voltage data pieces stored in said storage means.

11. The charging device as claimed In claim 4 wherein said average gradient calculation means calculates a difference between the most recent and oldest voltage data pieces stored in said storage means, accumulates the resultant difference, and divides accumulative value by the number of times the difference has been accumulated for calculating an average gradient.

12. The charging device as claimed in claim 11 wherein said difference between the most recent and oldest voltage data pieces is accumulated from starting of charging to the present.

13. The charging device as claimed in claim 4 wherein said charging termination determination means turns on an identification flag when it is determined that the most recent gradient becomes greater than the average gradient by the predetermined value or more in response to the output of said gradient comparison means, said termination determination means, when the flag is on, for monitoring the output of said voltage comparison means and determining termination of charging.

14. The charging device as claimed in claim 1 wherein said secondary battery is a nickel-hydrogen battery.

15. A method of charging a secondary battery for detecting terminal voltage of the secondary battery during charging for controlling termination of the charging, said charging method comprising:
   a step for detecting a terminal voltage of said secondary battery;
   a most recent gradient calculation step for finding a most recent gradient of the terminal voltage detected by said detection step;

an average gradient calculation step for finding an average gradient, for a comparatively long term, of the terminal voltage detected by said detection step;

a gradient comparison step for comparing said most recent gradient with said average gradient;

a voltage comparison step for comparing the most recent terminal voltage with a previously measured terminal voltage;

a termination determination step subsequent to said gradient comparison step and said voltage comparison step for determining termination of charging by the fact that said most recent terminal voltage becomes equal to or less than said previously measured terminal voltage at a time after said most recent gradient becomes greater than said average gradient by at least a predetermined value; and a control step responsive to the termination of charging determined by said termination determination step for terminating the charging current to the secondary battery.

16. A method of charging a secondary battery comprising:

detecting a terminal voltage of said secondary battery;

calculating a most recent gradient of the terminal voltage detected by said detecting step;

calculating an average gradient over a comparatively long term, of the terminal voltage detected by said detecting step;

comparing said most recent gradient with said average gradient;

comparing the most recent terminal voltage with a previously measured terminal voltage subsequent to said gradient comparison step and generating a termination signal in response to said most recent terminal voltage becoming equal to or less than said previously measured terminal voltage at a time after said most recent gradient becomes greater than said average gradient by at least a predetermined value; and terminating the flow of charging current to the secondary battery in response to said termination signal.

* * * * *